United States Patent
Thomas et al.

(10) Patent No.: US 8,219,425 B2
(45) Date of Patent: *Jul. 10, 2012

(54) COLLATERAL DAMAGE COVERAGE FOR INSURERS AND THIRD PARTIES

(76) Inventors: Bruce Bradford Thomas, Trumbull, CT (US); Lester Ware Preston, Darien, CT (US)

( * ) Notice: Subject to any disclaimer, the term of this patent is extended or adjusted under 35 U.S.C. 154(b) by 964 days.

This patent is subject to a terminal disclaimer.

(21) Appl. No.: 12/220,189

(22) Filed: Jul. 23, 2008

(65) Prior Publication Data

US 2008/0306779 A1     Dec. 11, 2008

Related U.S. Application Data

(63) Continuation-in-part of application No. 10/705,439, filed on Nov. 10, 2003, now abandoned.

(51) Int. Cl.
*G06Q 40/00* (2012.01)
(52) U.S. Cl. .............................................. 705/4; 705/35
(58) Field of Classification Search .................. 705/4, 35
See application file for complete search history.

(56) References Cited

OTHER PUBLICATIONS

U.S. Appl. No. 10/647,078, filed Nov. 18, 2004, Bruce B. Thomas, Entire Document.
U.S. Appl. No. 10/705,439, filed May 12, 2005, Bruce B. Thomas, Entire Document.
U.S. Appl. No. 11/891,761, filed Dec. 6, 2007, Bruce B. Thomas, Entire Document.
Clyde M. Kahler, Business Interruption Insurance, Philadelphia, 1930, Preface and pp. 16-24.
Gillis, Ellis & Baker, Inc., "Total Plus," Insurance Policy.
New Product—"Samuri", Willis Faber & Dumas, Market Fax, London, 1989, 3 Pages.

*Primary Examiner* — Lalita M Hamilton

(57) ABSTRACT

A method for marketing, underwriting, and adjusting damages that are associated with insured loss events but that are not covered by traditional insurance policies. This method permits the marketing of loss expense coverage, underwriting, and claim adjustment processes of insurance to be performed by reference to the loss payments that are made by a specified reinsurance policy. By referencing reinsurance loss payments, which both a buyer and a seller understand, this method provides an easy way to communicate and transact something that is otherwise difficult or impossible to define or measure.

25 Claims, 4 Drawing Sheets

---

Receive a collateral damage claim from a buyer comprising an identifier of a collateral damage contract and proof of payment made under a referenced reinsurance policy
42

↓

Assess the validity of said collateral damage claim by reviewing the seller's records of valid collateral damage contracts and information about each contract
44

↓

Determine and approve an appropriate claim payment amount
46

↓

Pay said appropriate claim payment to said buyer
48

COLLATERAL DAMAGE COVERAGE FOR INSURERS AND THIRD PARTIES

CROSS-REFERENCE TO RELATED APPLICATIONS

This application is a continuation-in-part of nonprovisional patent application Ser. No. 10/705,439, entitled Collateral Coverage for Insurers and Advisors, filed on Nov. 10, 2003 now abandoned. This application is related to nonprovisional patent application Ser. No. 10/647,078, filed on Aug. 22, 2003.

FIELD OF INVENTION

This invention is in the field of insurance.

BACKGROUND OF THE INVENTION

Insurance is a means by which the risk of loss is contractually shifted from the insured to the insurer. Under this contractual arrangement, the insured pays a premium to the insurer for agreeing to bear some potential loss that the insured faces. Insurance is a very valuable financial tool that helps individuals and legal entities manage the risks they face.

Insurance works best in instances where the definition of loss is clear and the amount of loss is obvious. If a loss is not easy to define or prove, it should not be insured by a policy that requires such proof, because it will be difficult or impossible to set an appropriate premium. Moreover, it will result in unduly complex coverage terms, disagreements over coverage interpretation, and difficulties in proving and quantifying losses.

To be eligible to receive insurance payments, insurance buyers must be able to prove that they had losses and that those losses fit within the coverage definition of their insurance. Losses can be categorized in many different ways such as life, health, property, casualty, etc. More generally, losses can be categorized as being direct or indirect.

A direct loss is a loss where the insured peril is the proximate cause of the loss. For example, the direct loss of a factory due to a fire would be the cost of rebuilding the factory. The indirect losses would be all of the costs associated with the inconvenience of not having a workable factory. Direct losses, such as the physical cost of the buildings in this example, are typically much easier to estimate than indirect losses such as lost income or extra expenses that may result from such an event. Management and employees must spend time trying to recover from this event, and there is always a significant amount of opportunity cost that can never be adequately assessed.

Indirect losses vary in size depending on the specifics of the loss, but they occur with every type of insurable loss. Insurance can cover certain limited types of indirect costs that can be defined and proved such as the loss of income (business interruption) and "extra" or "expediting" expenses that are necessary to return a business to normal after a loss. However, companies and individuals are not insured against many types of indirect losses because these losses are often too difficult to define in advance or prove after the fact to make an insurance transaction economically viable for both insurers and insurance buyers.

Furthermore, policyholders often have considerable discretion over indirect losses, making many types of indirect loss impossible to quantify and subject to significant moral hazard. Since indirect losses are becoming an ever larger part of most companies' loss experience, it is no wonder that companies are increasingly frustrated with traditional insurance.

Even when it is relatively easy to substantiate that a direct loss has occurred, it is not always easy to determine the value of that loss. In relatively simple cases, the insured must show receipts, appraisal documents, or other evidence that would substantiate value. Often appraisers must be called in to provide their opinions about value.

Transaction Costs

Selecting coverage, defining losses, and meeting other insurance requirements can be very burdensome for both insurers and their customers. In the year 2001, US property and casualty insurers spent more than $133 billion dollars in brokerage commissions, underwriting, and loss adjustment expenses. This amount represents approximately 39% of the premium dollars that they earned in that year.

Moreover, this amount does not reflect the significant costs that insurance buyers expended in getting coverage, substantiating their losses, and proving that those losses were covered under their insurance policies. The amount of time and expense that is involved in buying insurance and collecting on it can be very discouraging to insurance buyers, and it places new burdens on them when they are least able to deal with them.

Furthermore, it is not unusual for there to be disputes about what the cause of a loss was or if it is covered by insurance, and many claimants initiate litigation proceedings against their insurers to force them to pay. The inability to define in advance all the losses that will be covered by the policy makes it difficult for the insurance buyer to assess the value of the insurance policy and makes it equally hard on insurers to determine a fair premium.

The high costs of underwriting and loss adjusting are also huge deterrents to companies that would like to finance insurable risk. In effect, the large transaction costs associated with insurance represent a huge barrier that discourages third parties from offering coverage and increases the cost of capital that is necessary to finance risk.

New Approach Needed

Given high transaction costs and the necessity of defining and proving losses, it becomes clear that traditional insurance is a risk financing solution with significant limitations. Insurance proceeds are supposed to restore the policyholder to the same position that existed before the loss occurred. In practice, this is impossible. Deductibles, coinsurance, and coverage limits mean that insureds will never be fully recompensed for their losses. Moreover, many types of losses that are collateral to insured losses cannot be covered.

Hence there is a long-felt need for insurance buyers to be able to purchase insurance that covers losses that are collateral to insured losses but that are too difficult to define, prove, and measure to be covered under a traditional insurance policy. Often times, these collateral damages are discretionary in nature, and it is impossible to prove objectively that costs or expenses were necessary. Insurance buyers need a way to finance these collateral damages in a way that is simple, cost-effective and economically viable.

BACKGROUND OF INVENTION

Objects and Advantages

The object of the invention is a method for marketing, underwriting, and adjusting damages that are associated with insured loss events but that are not covered by traditional insurance policies, i.e. "collateral damages". This method provides a new and cost effective way to finance damages that are too difficult to define, prove, or measure to be covered by an insurance policy in the traditional way.

Collateral damage coverage eliminates most of the transaction costs that an insured would typically incur in purchasing insurance because it does not require lengthy or expensive underwriting and loss adjustment processes in the way traditional insurance does. As a result, it has the potential to eliminate more than 75% of the transaction costs that insurers typically have. These cost include sales, underwriting, and loss adjustment expenses and amount to approximately forty percent of property/casualty premium dollars in the United States. Reducing these costs increases profits for coverage sellers and enables them to reduce premiums for coverage buyers.

Collateral damage coverage is extremely versatile from a contractual perspective and may be structured as an insurance policy or as a derivative contract. This is important because it enables companies and individuals that are not licensed as insurers to provide this coverage.

By substantially streamlining the underwriting and loss adjustment processes that are necessary to provide insurance-type coverage, collateral damage coverage reduces barriers to entry and enables new companies to finance the risk of collateral damages. This gives insurance buyers access to new sources of risk capital and is particularly valuable in "hard" insurance markets when traditional insurance prices are high and coverage is difficult to obtain.

There are an infinite variety of ways to structure a collateral damage coverage contract which enables coverage buyers and sellers to create risk transfer products that are tailored to their own specific needs.

Collateral damage coverage also permits access to cheaper sources of capital than any other existing financial alternative. This is because individual insurers exhibit much greater loss volatility than does the insurance industry as a whole. By offering collateral damage coverage that references many different insureds of many different insurers, a coverage provider can mimic the loss experience of the industry and reduce its loss volatility. This diminishes the amount of capital that is needed to finance this risk, and it reduces the cost of that capital too since investors prefer lower profit volatility. These benefits can then be shared with coverage buyers in the form of lower premiums.

These general objects and advantages are the same as those described in patent application Ser. No. 10/647,078, entitled Secondary Loss Expense Coverage, filed on Aug. 22, 2003 by the present inventors. The difference between these two applications is that this application relates to providing Collateral Damage Coverage to insurers and third parties that would suffer significant collateral damage if many insureds suffered loss and this type of Collateral Damage Coverage references a reinsurance policy rather than an insurance policy.

Collateral Damage Coverage was originally conceived as a means of helping insureds finance losses that were collateral to an insurance policy but not paid by that policy. However, subsequent investigations have demonstrated that this concept also holds great promise as a means of helping insurers, reinsurers, and other parties that may suffer significant collateral damages when reinsurance policy payments are made. Collateral damages for these parties include such things as lost income, lost productivity, credit losses, additional borrowing costs, reputation maintenance expenses, accounting expenses, legal costs, consulting, and other types of discretionary expenses that are related to reinsurance policy payments.

Thus, the present application enables a different type of Collateral Damage Coverage to be provided, referencing a different type of coverage (reinsurance rather than insurance), serving a different class of potential insureds (entities that would suffer Collateral Damages in relation to reinsurance payments). Other objects and advantages will become apparent from a consideration of the ensuing description and drawings.

SUMMARY OF THE INVENTION

The Summary of the Invention is provided as a guide to understanding the invention. It does not necessarily describe the most generic embodiment of the invention or all species of the invention disclosed herein.

This method permits the marketing of loss expense coverage, underwriting, and claim adjustment processes of insurance to be performed by reference to the loss payments that are made by a specified reinsurance policy. By referencing reinsurance loss payments, which both a buyer and a seller understand, this method provides an easy way to communicate and transact something that is otherwise difficult or impossible to define or measure, i.e. collateral damages.

For example, a company that is interested in offering collateral damage coverage on a commercial property reinsurance policy could communicate to potential buyers that it is willing to provide them with coverage for damages that are collateral to the losses covered by that policy. It could use this method to communicate the terms and conditions on which this coverage would be offered by referring to their existing reinsurance policies.

The seller in this example could state that it is willing to provide a payment equal to 20% of any payment that a reinsured receives from its reinsurance policy in return for a premium equal to 20% of the premiums that the reinsured pays for its traditional reinsurance policy. It could further state that it is willing to offer this coverage for all reinsurance policies that cover commercial insurance losses in the United States that are written by a list of specified reinsurers.

The seller in this example needs no experience or judgment in this particular subset of the reinsurance market. By referencing the reinsurance that has already been transacted in this market, the seller has availed itself of the judgments and expertise of the underwriters and loss adjustment experts that are already in the referenced reinsurance market.

The more specific the seller can be about the terms and conditions under which it will offer this coverage, the more transaction cost it can eliminate. In this example, the seller has encouraged buyers that meet its specifications and desire this coverage to contact it, and it has discouraged everyone else. Using this method, buyers know exactly what the coverage is and what it will cost without having to do any investigation. Because the collateral damage coverage terms and conditions have been predefined by reference to an existing reinsurance policy, traditional underwriting and policy drafting is simple.

When and if there is a loss, the buyer does not have to substantiate the loss as it would with a traditional insurance policy. The buyer only has to substantiate that it received payment under the referenced reinsurance policy. The seller saves time and money, too, because it does not have to undertake an extensive loss adjustment process to determine the collateral damage payment amount.

This method eliminates the subjectivity that is an inherent part of providing insurance for losses that are difficult to define and measure. In the example above, the collateral damage payment was determined by multiplying 20% times the paid reinsurance loss that was referenced in the contract.

DETAILED DESCRIPTION

FIGS. 1-4

Figure 1:
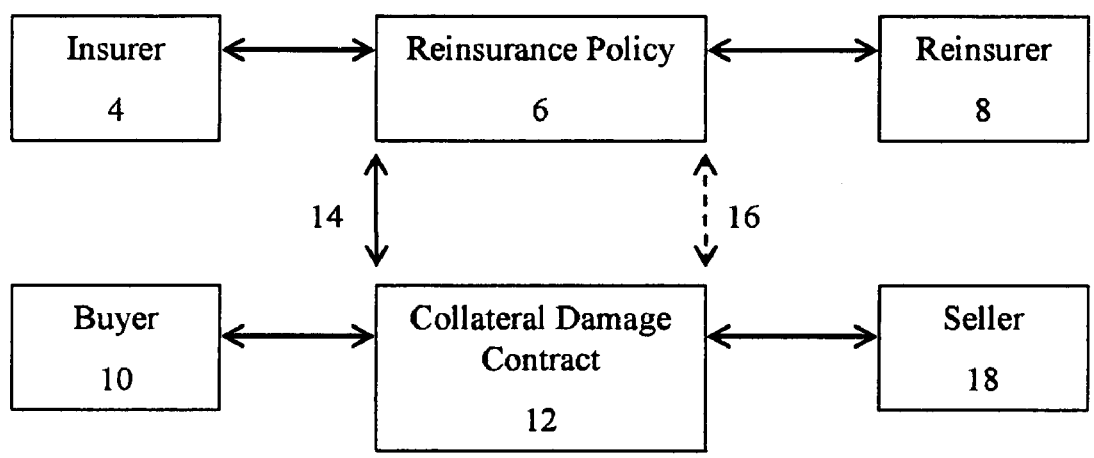
FIG. 1 shows a collateral damage contract that bears a functional relationship between its premiums and the premiums paid for a referenced reinsurance policy as well as a functional relationship between the losses paid by the collateral damage contract and the losses paid by the referenced reinsurance policy.

The following detailed description discloses various embodiments and features of the invention. These embodiments and features are meant to be exemplary and not limiting.

DEFINITIONS

The definitions provided below are to be applied to their respective terms or phrases as used herein unless the context of a given particular use of a given term or phrase clearly indicates otherwise.

The term "insurance policy" refers to a written contract between an insured and an insurance company stating the obligations and responsibilities of each party. An insurance policy enables an insured to transfer its own risks to an insurer.

The term "reinsurance policy" refers to a written contract between an insurer and another insurer called a reinsurer transferring the risk of loss of some insurance policies. A reinsurance policy differs from an insurance policy in that it enables an insurer to transfer risk that it has assumed via an insurance policy or another reinsurance policy to another insurer.

The term "collateral damages" refers to economic damages that an insured sustains as a result of an insured loss event but which are not covered by the insured's traditional insurance or reinsurance policies (in the case of an insurance company).

The term "collateral damage coverage" or "collateral damage contract" refers to a contractual means of financing the risk of loss associated with damages that are collateral to insured loss events but which are not covered by a referenced insurance or reinsurance policy. Collateral damage coverage may be provided in the form of an insurance policy or a derivative contract.

The term "derivative contract" refers to any contract that exhibits any of the following characteristics: the contractual language states that it is not a contract of insurance; the party that assumes the risk is not an insurance company; the contract is governed by the principle of "caveat emptor" rather than "utmost good faith"; the contract is not a contract of adhesion by the governing legal and regulatory authorities; the buyer may sell, give, or exchange the contract to a third party; or the contract is not treated as an insurance contract by the relevant regulatory bodies.

The term "contractual payment provision" refers to a provision in an insurance or derivative contract that describes the payments that will be due under a collateral damage contract.

The term "all risks commercial property insurance" refers to a commercial property insurance policy that includes business interruption and extra expense coverage.

The term "referenced reinsurance policy" or "specified reinsurance policy" refers to a reinsurance policy that is referenced by a collateral damage contract and from which the collateral damage contract derives its value.

The term "referenced paid losses" refers to the paid reinsurance losses from which the amount of the collateral damage payment will be derived. The referenced paid losses may be all losses that are paid by the referenced reinsurance policy or they may be a subset of these losses.

The term "coverage subset" refers to referenced paid losses that are quantitatively or qualitatively less than the totality of losses that are covered by the referenced reinsurance policy.

The term "qualitative coverage subset" refers to any qualitative limitations that may be imposed on the losses paid by the referenced reinsurance policy, from which the collateral damage payment may be derived. For example, a collateral damage contract might exclude certain types of losses that are covered by the referenced reinsurance policy. This could be achieved by excluding certain coverage parts, types of coverages, or perils. Qualitative coverage limitations imposed on the referenced reinsurance policy may be based on many other factors as well.

The term "quantitative coverage subset" refers to any quantitative limitations that may be imposed on the losses paid by the referenced insurance policy, from which the collateral damage payment may be derived. These quantitative limitations may take the form of deductibles, retentions, limits, and coinsurance that are applied to the paid losses of the referenced reinsurance policy.

The term "function" refers to a mathematical function that will be applied to the referenced paid losses to determine a collateral damage payment that is scaled based on the size of the referenced paid loss. This term refers to both proportional and nonproportional functions, where the payment is scaled based on the size of the referenced paid loss. The term "function" does not include mathematical functions that express a binary output of either zero or a single amount based on the amount of the referenced paid losses.

The term "proportional function" refers to a mathematical function that will be applied to the referenced paid losses to determine a collateral damage payment that is scaled based on the size of the referenced paid loss and that pays a constant percentage for every dollar of referenced paid loss. A collateral damage payment that equals 10% of a particular reinsurance policy's payments, excluding losses from hurricanes, less a $50,000 deductible, and subject to a limit of $50 million, is an example of a proportional function.

The term "nonproportional function" refers to a mathematical function that will be applied to the referenced paid losses to determine a collateral damage payment that is scaled based on the size of the referenced paid loss and where the proportion of coverage changes as the referenced paid losses increase. A nonproportional function is any function that cannot be graphed as a straight line but where the amount of the payment is scaled based on the size of the referenced loss payment. An example of a nonproportional function is collateral damage coverage that pays nothing for the first $100 thousand of referenced paid loss, pays 10% of the referenced reinsurance payment between $100 thousand and $1 million, and then pays 20% of the referenced reinsurance payment above that amount, subject to a limit of $50 million. Exponential and nonlinear mathematical functions are other types of nonproportional functions.

The term "function of premiums" refers to a mathematical function that expresses the cost of collateral damage coverage in relationship to the premiums charged for the referenced reinsurance policy.

The term "entity" refers to a party to a collateral damage contract such as an individual, married couple, or a legal entity (corporation, limited liability company, partnership, etc.).

The term "buyer" refers to an entity that buys a collateral damage contract. This term encompasses both direct and indirect buyers as well as other entities that are paid by the buyer to assist it to purchase collateral damage coverage such as advisors, brokers, software vendors, information service companies, etc.

The term "direct buyer" refers to an entity that buys a collateral damage contract that references a reinsurance policy that said entity owns.

The term "indirect buyer" refers to an entity that buys a collateral damage contract that references another entity's insurance policy. For example, an indirect buyer might be the parent company or affiliate of the legal entity that purchased the referenced reinsurance policy. An indirect buyer might also be an unrelated entity that would be adversely affected if the entity that purchased the referenced reinsurance policy had a loss.

The term "seller" refers to an entity that sells a collateral damage contract. This term encompasses both direct and indirect sellers as well as other entities that the loss seller pays to help it conduct this business such as advisors, agents, brokers, information service providers, software vendors, underwriters, administrators, claims handlers, etc.

The term "direct seller" refers to an entity that sells a collateral damage contract that references a reinsurance policy that said entity insured.

The term "indirect seller" refers to an entity that sells a collateral damage contract that references a reinsurance policy to which said entity is not a party. An indirect seller might be a parent company or affiliate of the insurer that sold the referenced insurance policy or it might be an entity that is unrelated to the insurer of the referenced insurance policy. An indirect seller might be another insurance company, a reinsurance company, a financial institution, a hedge fund, a mutual fund, or some other type of legal entity.

The term "underwriting" refers to a seller's risk selection process. Underwriting is the process that a seller uses to determine acceptable pricing and coverage terms of the collateral damage coverage it offers. Underwriting includes the process of getting information from and disseminating information to buyers.

The term "underwriter" refers to an individual, an information system, or a legal entity that does underwriting for the benefit of the seller.

The term "commercial" refers to insurance policies that are sold to businesses, commercial institutions, non-profit and not-for-profit companies, professional organizations, governmental institutions, municipalities, etc. Such policies include business auto, businessowners, crime, commercial general liability, commercial property, business interruption and extra expense, boiler and machinery, business life and health, workers compensation, etc. Commercial insurance is contrasted with "personal" insurance.

The term "personal" refers to insurance policies that are sold to individuals and protect individuals against losses to such things as their personal property, their real property, their health, and acts for which they may be liable. This term refers to such insurance policies as personal auto, homeowners, personal property, personal liability, disability, health, accident, life, etc. This term is contrasted with "commercial" insurance.

The term "information system" refers to one or more computers, servers, input devices, output devices, data storage devices, telecommunications equipment and software. Information systems may communicate with other information systems via telecommunications means, such as the Internet. Information systems may also communicate with persons via input/output devices. Persons may communicate with other persons using information systems.

Product Overview

FIG. 1 shows how a collateral damage contract's premiums and loss payment may be related to the premiums paid for and the losses recovered under a reinsurance contract. It also shows the various parties to these contracts. An insurer 4 has a reinsurance policy 6 with a reinsurer 8. The reinsurance policy may have one or more coverage parts and may specify various deductibles, retentions, limits, coinsurance, and exclusions.

A buyer 10 is interested in buying loss protection via a collateral damage contract 12. The buyer may be the insurer 4, in which case it would be classified as a "direct buyer", or it may be some other entity that would suffer collateral damages if there were payments made under the reinsurance policy, in which case it would be classified as an "indirect buyer".

The collateral damage contract's loss payment 14 is shown as a solid line with two arrows and is a function of the losses that are paid by the reinsurance policy or a coverage subset of a reinsurance policy. The collateral damage contract's premiums 16 are shown as a dotted line with two arrows as the premiums may or may not be based on a function of the reinsurance policy's premiums.

It is traditional for underwriters to express premiums as dollar amounts, but the nature of a collateral damage contract enables underwriters to express the premium as a function of the reinsurance policy's premiums, as well. Expressing the premium as a percentage or some other function of the reinsurance policy's premiums is a highly efficient and beneficial way of communicating the underwriter's intentions and preferences to loss protection buyers.

In this way, buyers can understand the range of feasible collateral damage policies before they have submitted any information to the seller. However the premium is expressed, it must give the buyer value and allow a seller 18 to make money.

The seller 18 may be the same as the reinsurer 8, in which case it would be classified as a "direct seller", or it may be some other entity that is interested in providing collateral damage coverage, in which case it would be classified as an "indirect seller".

Marketing Collateral Damage Coverage

Figure 2:
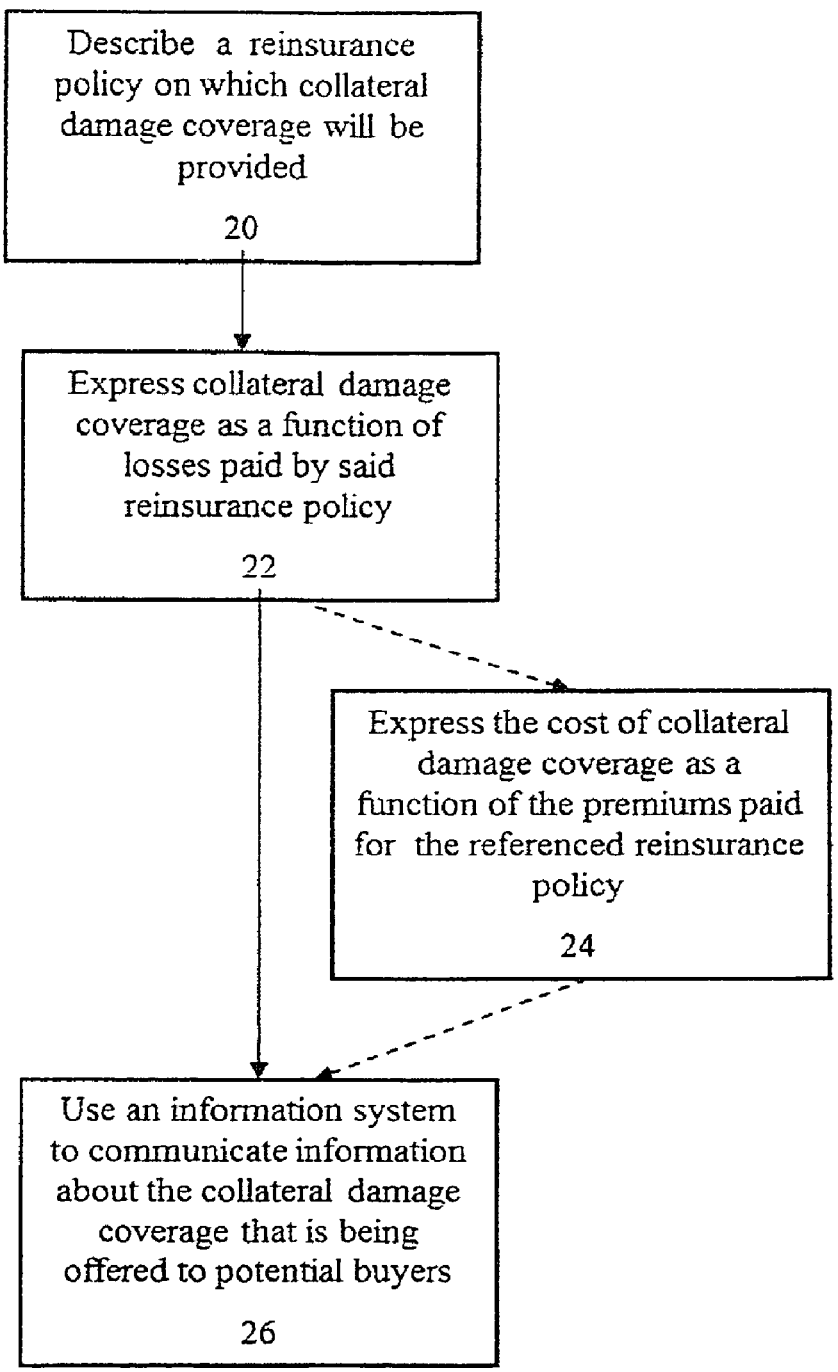
FIG. 2 is a flowchart that demonstrates how this method can be used to market collateral damage coverage.

The flowchart in FIG. 2 illustrates how this business method can be used to market collateral damage coverage to potential buyers. First, a seller must describe a reinsurance policy on which it wants to provide collateral damage coverage 20.

This description could be as limited as identifying a desire to provide coverage on one or more broad categories of reinsurance policies such as personal, commercial, property, casualty, health, workers' compensation, disability, accident, etc. Alternatively, the seller might be more specific about the coverage it wants to provide. For example, the seller might specify that it is willing to provide collateral damage coverage on reinsurance policies relating to commercial property insurance policies with between $5 million and $20 million in annual premiums. In the extreme, a seller may indicate a particular reinsurance policy on which it would be willing to offer collateral damage coverage.

A seller will make this determination based on its views about how profitable this new business is likely to be and whether it will act to diversify its overall portfolio of exposures. The seller in the previous examples may think that the reinsurance policy or policies it has described are likely to have preferred loss experience in relation to its other opportunities for expansion. It may also desire to offer this coverage because it recognizes that collateral damage coverage provides the seller with an opportunity to learn about the traditional insurance or reinsurance coverage on which this policy is based before the seller decides whether or not it makes sense to offer this type of traditional insurance or reinsurance coverage.

Alternatively, a seller may decide that it makes sense to offer collateral damage coverage without having any detailed knowledge of these exposures or their loss experience. In this case, the seller may rationally conclude that it is up to the reinsurers to offer reinsurance on terms that are economically viable and that the seller can make more money than the reinsurers because it will incur much smaller transaction expenses offering collateral damage coverage. Collateral damage coverage does not require as much operational infrastructure as reinsurance does because the underwriting and loss adjustment processes are so much simpler.

Next, the seller must express the amount of collateral damage coverage it is willing to offer as a function of the losses paid by the reinsurance policy it describes 22. This relationship may be expressed as a proportional or a nonproportional function. For example, the seller might state that it is willing to provide collateral damage coverage that will pay up to 30% of the losses paid by the referenced insurance policy.

This function is critically important because it enables a seller to speak definitively about losses that are difficult to define, prove, or measure. Once set, this function eliminates the element of judgment from the determination of collateral damages. As soon as the amount of the referenced paid losses is known, the amount of the collateral damage payment is known. No experimentation is required to perform this step because any type of function of losses paid by a reinsurance policy works so long as it is truly a mathematical function and unambiguously maps the amount of the referenced paid loss to the collateral damages payment.

In this example, the collateral damage coverage is based on all of the losses paid by the referenced reinsurance policy. However, the seller may also specify any qualitative or quantitative coverage limitations that it wants to impose by indicating that the function will be based on a coverage subset of the type of reinsurance policy it has described. For example, the seller may limit the collateral damage coverage it provides by excluding losses from hurricanes, imposing a franchise deductible equal to $50 thousand, and limiting the amount of the losses it will pay to $20 million. Regardless of the function and the qualitative and quantitative coverage subsets that the seller uses to limit the coverage, it must ensure that the maximum payout or limit does not exceed the maximum amount of coverage that the seller is able to offer (also known as "reinsurance capacity").

Indicating that a seller is willing to provide collateral damage coverage is not nearly as informative as letting potential buyers know that the seller will provide collateral damage coverage to them in particular. It is better still, if the seller is willing to communicate the terms of the coverage it is willing to offer.

Ideally, a seller will describe not only the characteristics of a reinsurance policy on which it is willing to write collateral damage coverage and the terms and conditions of this coverage, but the cost of this coverage, too 24. This can be done by expressing the cost of the collateral damage coverage as a function of premiums charged for the type of reinsurance policy that the collateral damage coverage will reference, i.e. the referenced reinsurance policy. This step is shown with dotted arrows leading to and from it, because it is not essential to this process.

The seller in the preceding example could indicate that it is willing to offer collateral damage coverage on a pro rata basis. In other words, the buyer can get a payment equal to 30% of the referenced paid losses, in return for paying 30% of the premiums of the referenced reinsurance policy.

No experimentation is necessary to set premiums for collateral damage coverage. If the seller believes that the premiums for the referenced reinsurance policies are set appropriately, then it can determine the appropriate collateral damage coverage premiums by applying the payment function to the referenced reinsurance premiums.

If the seller believes that the referenced reinsurance premiums are mis-priced in some way, it can adjust its payment function to ensure that it is receiving an adequate rate on the collateral damage coverage it offers. For example, if the seller feels that the referenced reinsurance premiums were 10% cheaper than they should have been, it could express that it is willing to provide 30% collateral damage coverage for 33% of the referenced reinsurance premiums.

The more specific the seller can be about the type and cost of the coverage it is willing to offer, the more useful this information will be, and the more transaction cost that it can eliminate. Assuming that the seller has communicated the type of reinsurance policies it is willing to reference, the terms and conditions of the collateral damage coverage it offers, and the cost of this coverage, buyers have all the information they need to make a purchase decision.

Finally, the seller uses an information system to communicate information about the collateral damage coverage that it is willing to offer to potential buyers 26. There are many ways that information systems can be employed to market collateral damage coverage to potential buyers. For example, the seller may post this information on its website, may send emails to potential buyers or buyer representatives, may employ telephonic, radio or television communications, and may employ third parties such as managing general agents or other marketing or information services to use information systems to convey this information to potential buyers or their representatives.

This information may also be conveyed in the form of an electronic interface that enables buyers to get up-to-the-moment information about the coverage that is offered, to determine if they qualify for that coverage, to determine how much the coverage cost, and to input and update information about their exposures. As collateral damage coverage is sold, the seller may find that it needs to limit or alter the coverage it is willing to offer by geographic area, by occupancy, by account size, or any other criteria so that it can stay within its underwriting guidelines. In this case, the ability to quickly alter the coverage information that the seller communicates to buyers is very valuable.

One skilled in the art will recognize that this process makes damages that were previously uninsurable, because they could not be described or quantified, insurable by reference to damages that are already being reinsured. This process enables definition and measurement of something that was previously nebulous, enabling a seller to communicate the terms of the collateral damage coverage and the price of this coverage to potential buyers via a brief statement without requiring any detailed information from the insured.

By transmitting one or two sentences of information via internet, radio or television, for example, a seller can convey both the terms of the coverage offered and the cost of the coverage to potential buyers. The efficiencies gained by this process are advantageous to both sellers and buyers.

The speed with which information about the seller's ability to offer coverage and its changing risk preferences can be conveyed to potential buyers helps create a much more efficient market for risk transfer. Since sellers can easily transmit this information, they can easily enter and exit areas in the reinsurance and insurance markets that they find advantageous.

One who is knowledgeable in the field of insurance and reinsurance will understand that financial service companies engage in numerous transactions and are subject to extensive regulation and oversight. Internal oversight takes place at the transaction level, at the operating unit level, at the division level, and at the company level, but financial service companies are also heavily scrutinized by their shareholders, rating agencies, regulatory bodies, government agencies, and tax authorities. The number of transactions in which they are engaged, the need for accuracy, computational speed, contractual consistency, the amount of analysis that they perform on these transactions, and the amount of oversight all necessitate the use of information systems to carryout this business method.

Method for Providing Collateral Damage Coverage

Figure 3:
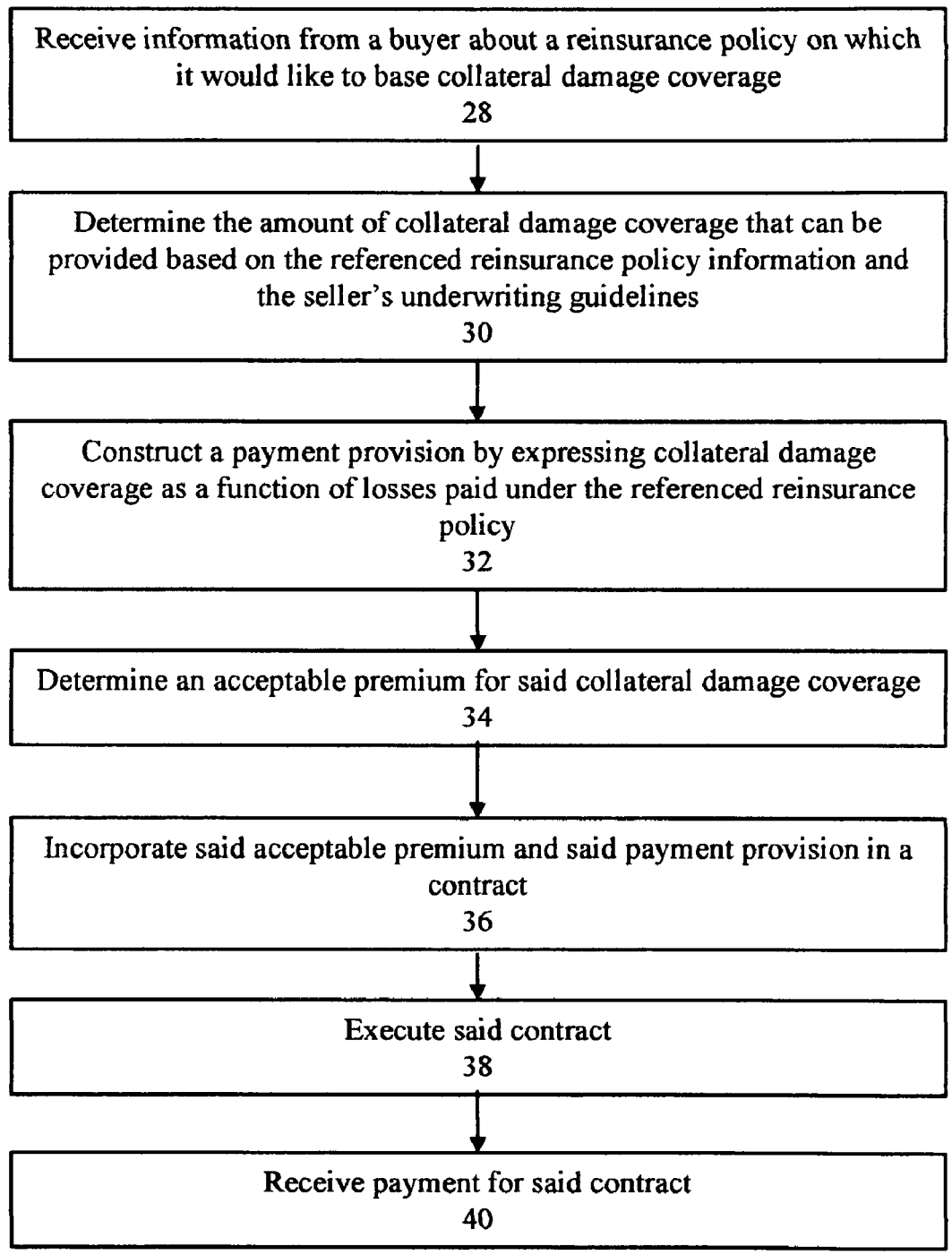
FIG. 3 is a flowchart that demonstrates how this method can be used to provide collateral damage coverage.

The flowchart in FIG. 3 illustrates how this business method can be used to provide collateral damage coverage. First, a seller must receive information from a buyer about a reinsurance policy on which the buyer would like to base collateral damage coverage 28. The buyer may be a direct buyer or an indirect buyer.

If the buyer is an indirect buyer, the underwriter may also want information that would help demonstrate that the indirect buyer would suffer collateral damages if the referenced reinsurance policy has losses. Understanding the buyer's interest in the reinsurance loss and connection to the reinsurance loss may be required if this contract is going to be structured as an insurance contract.

The information transmitted must be sufficient for the seller to determine if its underwriting criteria are met. For example, the underwriter may ask the buyer to provide a copy of the referenced reinsurance policy or binder, the amount of the referenced reinsurance policy's premiums, previous years loss experience, a schedule of insured values by location showing information related to type of construction, occupancy, protection, exposure rating, and other useful information. The underwriter may also request information about prior year's losses, engineering reports, or any other information that it finds useful.

The amount of underwriting information that is requested will vary based on each seller's individual underwriting requirements. Some sellers will want just enough information so that they can determine that an account fits their exposure profile. In this case, a sworn statement that the buyer fits the seller' underwriting criteria may be enough information for a seller to enter into a contract with a buyer. Other sellers may have a great deal of knowledge and experience in a given market segment and may desire to use the information they receive to help them set the collateral damage coverage terms and price.

Ideally underwriting information would be provided electronically via an information system to reduce transaction cost, improve the accuracy of the data, permit the data to be easily manipulated for use by other computerized systems, and to provide summary information about the seller's portfolio of exposures. This can be accomplished by using electronic mail, by transmitting the information via data storage devices such as CDs, DVDs, hard drives, and the like. It may also be accomplished by having the buyer or the buyer's representative input information directly into an information system that the seller uses to underwrite collateral damage coverage.

Using this information and its underwriting guidelines, the seller must determine how much collateral damage coverage it is willing to provide 30. For example, the seller's underwriting guidelines may state that exposures from certain occupancies cannot be accepted, that certain locations are restricted in some way, or that various deductibles and limits must be applied.

The seller may, for example, be concerned about having too much exposure to named windstorms (e.g. hurricanes) and want to keep a close watch on the exposures it insures in the Southeastern U.S. It may find that it is highly advantageous to use its underwriting data in catastrophe models to assess potential damage rates from different catastrophe scenarios, to help it manage its exposure accumulations, and to determine an acceptable price for the exposures it assumes.

Given that coverage terms and price have already been developed by the reinsurer of the referenced reinsurance policy, no experimentation is necessary. Nevertheless, each collateral damage coverage seller will have developed guidelines for the insurance coverage it may offer. These guidelines will be based so as to exceed regulatory thresholds and rating agency requirements and to meet the specific constraints that each seller sets for itself based on the amount of capital and reinsurance it has.

Having a database that is populated with up-to-date information about the exposures that a seller has underwritten is very useful, particularly for large sellers that have multiple divisions offering insured loss coverage. By reviewing such a database, underwriters working within or on behalf of the seller can be assured that they know of any other policies that the seller has written to the same buyer or on the same referenced insurance policy, before agreeing to provide additional loss protection via collateral damage coverage. With real-time information about the concentration of its exposures, a seller may decide that it makes sense for it to decline to provide coverage, or provide coverage but hedge or reinsure exposures that have grown too large.

Assuming that the collateral damage coverage meets the sellers underwriting guidelines, the underwriter must construct a payment provision by expressing the collateral coverage as a function of losses paid under the referenced reinsurance policy 32. This step can be handled manually or it may be accomplished via an information system, where the buyer inputs information directly into an information system about its exposure, selects the coverage it wants based on a menu of choices with which the seller has programmed the information system.

This function can be expressed as a proportional or a non-proportional function of the referenced paid losses. From an economic perspective, the seller should be indifferent to whether the loss payment function is proportional or nonproportional.

The buyer may desire one type of loss payment function better than another based on how understandable it is and based on how well it matches the collateral damages they expect to have over the range of the referenced reinsurance policy's paid losses. Proportional loss payment functions are desirable because they are easy to communicate and understand.

The referenced paid losses may be all of the losses paid by the referenced reinsurance policy or may be a coverage subset of that policy. The coverage subset may be qualitative or quantitative or both.

Next the seller must determine an acceptable premium for the specified collateral damage coverage 34. The seller may determine this premium by using an information system that calculates the premium of the collateral damage coverage based on the type and amount of coverage and pre-specified relationships with the premiums paid for the referenced reinsurance policy.

For example, the seller may decide that it wants to be in a particular reinsurance or insurance market and is willing to write collateral damage coverage at the market price. It can do this by agreeing to charge 10% of the referenced reinsurance policy's premium for a collateral damage payment that equals 10% of the paid losses under the referenced reinsurance policy. Having specified these relationships, the seller can program these functions into a computer that can then be used to calculate acceptable premiums for the collateral damage coverage that it offers.

Automating the calculation of collateral damage premiums is very useful because it reduces transaction cost, and it improves information flow, timeliness, and accuracy. For larger transactions, a seller may desire to use an underwriter to set an appropriate premium on a case by case basis by using their judgment in conjunction with information that the underwriter can obtain from catastrophe models, databases of historical losses, reviewing the pricing of recent transactions with similar exposures characteristics, and the use of other underwriting tools.

Assuming that the buyer and the seller can agree on the collateral damage coverage and the premium charged for that coverage, the seller must incorporate this information in a contract 36. This contract may be structured so that it is treated as an insurance policy or as a derivative. The seller may use information systems to generate this contract so as to standardize the contract wording, reduce the possibility for errors, and reduce transaction cost.

Next the contract is executed 38. This may be accomplished manually or electronically based on the relevant laws applicable to each type of contract and the preferences of the parties. It is highly advantageous for the seller to update its database of valid contracts and exposures with the pertinent information from each contract as it is executed.

Finally, the seller receives payment for the collateral damage contract 40. This payment may be made manually or may be paid with the use of information systems that are used to improve the flow of funds from the buyer to the seller. The seller may also use an information system to account for this payment in its books and records.

The process, as shown in FIG. 3 and more fully discussed above, can range from a system that is fully automated to process that uses information systems as needed to accomplish one or more of the process steps outlined above. Depending on the level of automation, certain steps described above may occur in a different sequence or may occur simultaneously.

One who is knowledgeable in the field of insurance and reinsurance will understand that financial service companies engage in numerous transactions and are subject to extensive regulation and oversight. Internal oversight takes place at the transaction level, at the operating unit level, at the division level, and at the company level, but companies are also heavily scrutinized by their shareholders, rating agencies, regulatory bodies, government agencies, and tax authorities. The number of transactions in which they are engaged, the need for accuracy and computational speed, the amount of analysis that they perform on these transactions, and the amount of oversight employed all necessitate the use of information systems to carryout this business method.

One skilled in the art will recognize that this process enables buyers and sellers to easily and efficiently convey information and transact loss exposures that are difficult to define, measure, or prove. Absent this business method, these exposures would not be transacted.

Although sellers may decide to employ judgment at various stages of this process or may employ different underwriting guidelines based on their particular preferences, such judgment is not necessary to use this business method. Sellers with no insurance experience or expertise may mimic the underwriting styles and techniques of any particular segment of the reinsurance market, or any particular reinsurer, by charging the same rates and offering the same coverage terms as the insurance policies that are referenced.

This business method enables companies that are not in the reinsurance or insurance businesses or are not in a particular segment of these businesses to offer loss coverage by piggybacking off of the work and expertise of the reinsurance industry's best underwriters and claim adjusters. If they would like to earn more money from accepting these loss exposures than the referenced insurance, sellers can simply charge more for this coverage or restrict the losses they cover in relation to the referenced reinsurance payments.

However, collateral damage coverage sellers have a huge economic advantage over the reinsurance they reference because of the transaction efficiencies that this business method offers. If sellers follow the referenced reinsurance policy's coverage and premium terms, their loss ratio will be exactly the same as the referenced reinsurance, but their expenses will be as much as 75% less due to the fact that traditional underwriting and loss adjusting is not necessary to write collateral damage coverage. These transaction efficiencies have the potential to boost profit margins by more than 100%.

Method for Adjusting Collateral Damage Claims

Figure 4:
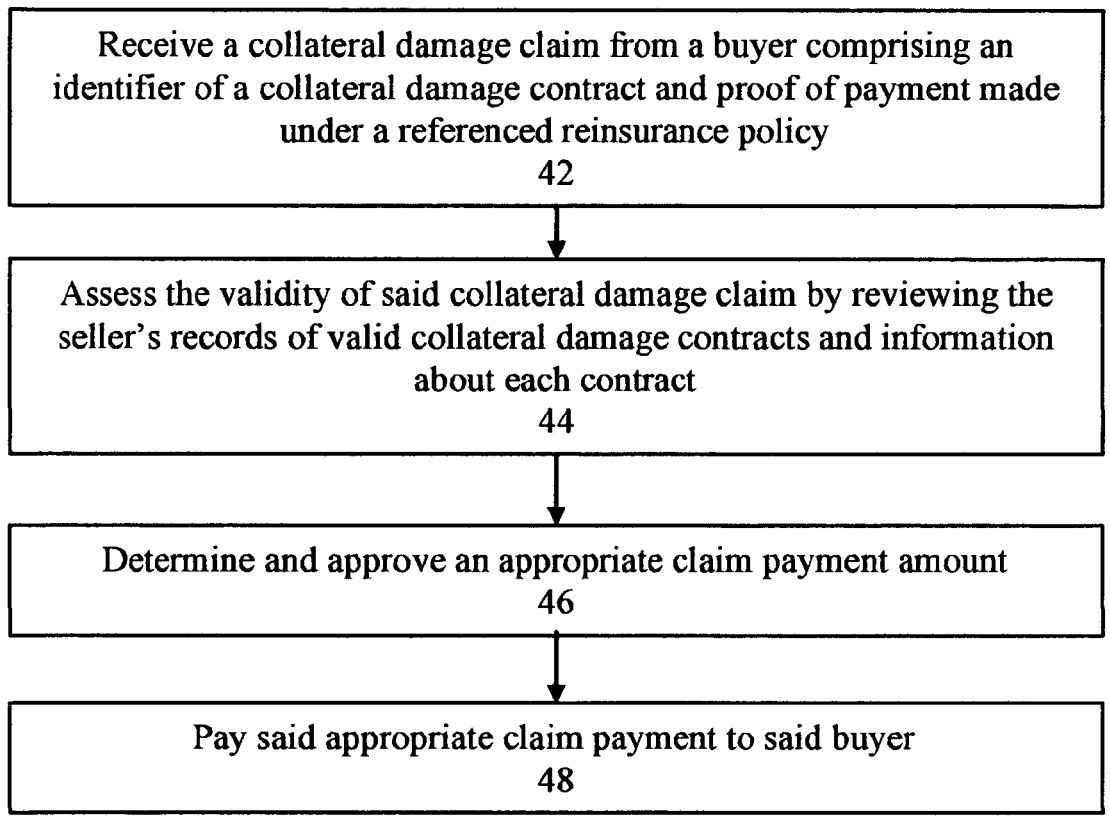
FIG. 4 is a flowchart that demonstrates how this method can be used to adjust collateral damage claims.

The flowchart in FIG. 4 illustrates how this business method can be used to adjust collateral damage claims 42. First, a seller must receive a collateral damage claim from a buyer. This claim must contain enough information so that the seller can determine that it has a responsibility to pay the claim and determine the amount of the claim that should be paid.

At a minimum, this information will contain an identifier of a collateral damage contract and proof that a payment was made under a referenced reinsurance policy. Depending on the terms of the collateral damage contract, the seller may demand more information from the buyer. More information may be necessary in instances where the contract is based on a qualitative subset of the referenced reinsurance policy. For example, if the collateral coverage contract has excluded damage from named windstorms, the seller will need to have enough information about the cause of loss to determine the amount of any payment that is due under the terms of the contract.

Next, the seller must assess the validity of the claim by reviewing its files to determine if the collateral damage contract identifier presented is valid and to get other information about the contract 44. For example, the seller will want to ensure that the claimant is listed as the contract owner in its records. It is most efficient if the seller stores this information electronically in the form of a look-up table, where the seller can review information about the contract by inputting the contract identifier into an information system.

Having validated the claim, the seller must calculate the claim payment amount and approve it for payment 46. The seller applies the payment function described in the collateral damage contract to the referenced paid losses to determine the amount of the payment it should make. Once it is satisfied that this calculation has been performed correctly, the claim is approved for payment. This may be handled in one or more steps based on the seller's protocols. Even though this process can be highly automated, the seller may desire to implement additional levels of oversight based on the size or complexity of the claim.

Finally, the seller pays the approved claim payment amount 48. This payment may be made manually or may be paid with the use of information systems that are used to improve the flow of funds from the seller to the claimant. The seller may also use an information system to account for this payment in its books and records.

The process as shown in FIG. 4 and more fully discussed above can range from a highly automated process to a process that uses information systems to accomplish one or more of the process steps outlined above. Depending on the level of automation, certain steps described above may occur at approximately the same time.

One who is knowledgeable in the field of financial services will understand that financial service companies engage in numerous transactions and are subject to extensive regulation and oversight. Internal oversight takes place at the transaction level, at the operating unit level, at the division level, and at the company level, but insurance companies are also heavily scrutinized by their shareholders, rating agencies, regulatory bodies, government agencies, and tax authorities. The number of transactions in which they are engaged, the need for accuracy and computational speed, the amount of analysis that they perform on these transactions, and the amount of oversight employed all necessitate the use of information systems to carryout this business method.

ADDITIONAL EMBODIMENTS

There are numerous embodiments of collateral damage coverage. This method can be applied to all types of reinsurance policies including property, casualty, health, life, disability, workers' compensation, accident, homeowners, auto, etc. Reinsurers may use this method to write a new policy or an endorsement to an existing policy so as to provide their customers with collateral damage coverage.

This method may be employed by direct and indirect sellers and may be useful to both direct and indirect buyers. It may be used to market, underwrite, and adjust loss payments relating to insurance policies and derivative contracts.

There are limitless ways of structuring collateral damage coverage by defining the referenced paid losses in terms of quantitative coverage subsets and qualitative coverage subsets. Additionally, there is an infinite variety of proportional and nonproportional payment functions that may be created.

ADVANTAGES

From the description above it should be clear that this method enables one to market, underwrite, and provide collateral damage coverage for losses that are too difficult to define, measure or prove to be covered by insurance in the traditional way. This method has the potential to reduce insurance transaction costs by as much as 75%, by eliminating the need for: an extensive and cumbersome sales process; a detailed and lengthy definition of covered losses; and proof of actual losses sustained.

This business method also:
a. Allows companies to offer a new form of coverage to their customers;
b. Permits coverage to be structured as insurance or as a derivative contract;
c. Enables different companies to offer loss coverage on the same insured loss events for the same insureds;
d. Permits non-insurers to offer loss coverage; and
e. Introduces more price competition to the insurance market by reducing the huge infrastructure costs that have been necessary to offer traditional insurance coverage to insurance buyers.

Although the description above contains certain specifics, these should not be construed as limiting the scope of the invention but as merely providing illustrations of some of the presently preferred embodiments of this invention. Clearly this methodology can be applied in many ways to all types of insurance and can be structured as insurance or as other types of financial contacts or separate provisions of other contracts. Thus the scope of the invention should be determined by the appended claims and the legal equivalents, rather than by any particular example described above.

We claim:
1. An information system, comprising:
a data storage device; and
a computer linked to the data storage device configured to:
receive and store in the data storage device contractual information for a plurality of valid Collateral Damage Coverage agreements, wherein the contractual information for each said valid Collateral Damage Coverage agreement includes a referenced reinsurance policy and a payment function that increases payment under the valid Collateral Damage Coverage agreement as a function of an increase in losses paid under the referenced reinsurance policy;
receive and store in the data storage device information for a valid Collateral Damage Coverage agreement claim that includes a payment that was made under the referenced reinsurance policy of a valid Collateral Damage Coverage agreement; and
calculate a payment amount for the Collateral Damage Coverage agreement by applying the payment function of the valid Collateral Damage Coverage agreement to the payment that was made under the referenced reinsurance policy that was included in the valid Collateral Damage Coverage agreement claim.

2. The information system of claim 1, where the computer performs the step of calculating the payment amount of the Collateral Damage Coverage agreement claim by applying a proportional function to the losses paid under the referenced reinsurance policy.

3. The information system of claim 1, where the computer performs the step of calculating the payment amount of the Collateral Damage Coverage agreement claim by applying a nonproportional function to the losses paid under the referenced reinsurance policy.

4. The information system of claim 1, where the computer performs the step of calculating the payment amount of the Collateral Damage Coverage agreement claim by applying the function to a qualitative coverage subset of the losses paid under the referenced reinsurance policy.

5. The information system of claim 1, where the computer performs the step of calculating the payment amount of the Collateral Damage Coverage agreement claim by applying the function to a quantitative coverage subset of the losses paid under the referenced reinsurance policy.

6. The information system of claim 1, where the computer performs the further step of generating a claim payment notice for the Collateral Damage Coverage agreement claim.

7. The information system of claim 1, where the computer performs the further step of transmitting information for the valid Collateral Damages Coverage agreement claim to a payment system.

8. The information system of claim 1, where the referenced reinsurance policy of the valid Collateral Damage Coverage agreement is a health reinsurance policy.

9. The information system of claim 1, where the referenced reinsurance policy of the valid Collateral Damage Coverage agreement is a personal property reinsurance policy or personal casualty reinsurance policy.

10. The information system of claim 1, where the referenced reinsurance policy of the valid Collateral Damage Coverage agreement is a commercial casualty reinsurance policy.

11. The information system of claim 1, where the referenced reinsurance policy of the valid Collateral Damage Coverage agreement is an all-risks commercial property reinsurance policy.

12. The information system of claim 1, where the referenced reinsurance policy of the valid Collateral Damage Coverage agreement is a commercial property and casualty reinsurance policy.

13. The information system of claim 1, where the referenced reinsurance policy of the valid Collateral Damage Coverage agreement is a workers' compensation reinsurance policy.

14. A computer-implemented method comprising the steps of:
receiving and storing in a data storage device contractual information for a plurality of valid Collateral Damage Coverage agreements, wherein the contractual information for each said valid Collateral Damage Coverage agreement includes a referenced reinsurance policy and a payment function that increases payment under the valid Collateral Damage Coverage agreement as a function of an increase in losses paid under the referenced reinsurance policy;
receiving and storing in the data storage device information for a valid Collateral Damage Coverage agreement claim that includes a payment that was made under the referenced reinsurance policy of a valid Collateral Damage Coverage agreement; and
a computer linked to the data storage device calculating a payment amount for the Collateral Damage Coverage agreement by applying the payment function of the valid Collateral Damage Coverage agreement to the payment that was made under the referenced reinsurance policy that was included in the valid Collateral Damage Coverage agreement claim.

15. The computer-implemented method of claim 14, where the calculating step performed by the computer comprises calculating a payment amount for the Collateral Damage Coverage agreement by applying a proportional function to the losses paid under the referenced reinsurance policy.

16. The computer-implemented method of claim 14, where the calculating step performed by the computer comprises calculating a payment amount for the Collateral Damage Coverage agreement by applying a nonproportional function to the losses paid under the referenced reinsurance policy.

17. The computer-implemented method of claim 14, where the calculating step performed by the computer comprises calculating a payment amount for the Collateral Damage Coverage agreement by applying the function to a qualitative coverage subset of the losses paid under the referenced reinsurance policy.

18. The computer-implemented method of claim 14, where the calculating step performed by the computer comprises calculating a payment amount for the Collateral Damage Coverage agreement by applying the function to a quantitative coverage subset of the losses paid under the referenced reinsurance policy.

19. The computer-implemented method of claim 14, where the computer performs the further step of generating a claim payment notice for the Collateral Damage Coverage agreement claim.

20. The computer-implemented method of claim 14, where the computer performs the further step of transmitting information for the valid Collateral Damage Coverage agreement claim to a payment system.

21. The computer-implemented method of claim 14, where the referenced reinsurance policy of the valid Collateral Damage Coverage agreement is a health reinsurance policy.

22. The computer-implemented method of claim 14, where the referenced reinsurance policy of the valid Collateral Damage Coverage agreement is a personal property reinsurance policy or personal casualty reinsurance policy.

23. The computer-implemented method of claim 14, where the referenced reinsurance policy of the valid Collateral Damage Coverage agreement is a commercial casualty reinsurance policy.

24. The computer-implemented method of claim 14, where the referenced reinsurance policy of the valid Collateral Damage Coverage agreement is an all-risks commercial property reinsurance policy.

25. The computer-implemented method of claim 14, where the referenced reinsurance policy of the valid Collateral Damage Coverage agreement is a commercial property and casualty reinsurance policy.

* * * * *